Aug. 3, 1954

M. STUBNITZ 2,685,329

SEAT SPRING

Filed May 10, 1949

INVENTOR.
Maurice Stubnitz
BY
Barnes, Kisselle, Laughlin & Raisch
Attorneys.

Aug. 3, 1954  M. STUBNITZ  2,685,329
SEAT SPRING

Filed May 10, 1949  2 Sheets-Sheet 2

INVENTOR.
Maurice Stubnitz
BY
Barnes, Kisselle, Laughlin & Raisch
Attorneys

Patented Aug. 3, 1954

2,685,329

UNITED STATES PATENT OFFICE 2,685,329

SEAT SPRING

Maurice Stubnitz, Adrian, Mich., assignor to Stubnitz Greene Spring Corporation, Adrian, Mich., a corporation of Michigan Application May 10, 1949, Serial No. 92,391

8 Claims. (Cl. 155—179)

This invention relates to seat springs. It is the object of the invention to provide a seat or seat back spring which will afford maximum comfort for the rider and at the same time effect economy in manufacture and transportation.

Quite recently the automobile industry has been experimenting with and, to some extent, using seat back and seat bottom springs which employ only wavy wire ribbons. These seat springs do not use any of the conventional helical load supporting springs but rely entirely upon the zig-zag wire ribbons to support the load. Springs of this kind are economical to manufacture and transport as they may be assembled on the job and shipped knocked down, but they are lacking in comfort as compared with the old style helical or coil springs.

It is the object of the present invention to obtain the advantages of this new type wavy wire spring seat and seat back, to wit: economy of manufacture and transportation, but at the same time to improve the riding qualities of the seat and the seat back. To this end, I provide a spring cushion which is made up of short length coiled springs in combination with flexible stringers which are supported at their ends by spring legs. This spring unit may be shipped without the bottom frame and assembled on the job by simply hooking the turned-over ends of the spring legs into the channel cross members of the supporting frame. This enables the spring seats to be telescoped together in shipping so that each spring seat occupies only substantially half of the shipping space that a normal spring seat occupies. These and other features will appear in the description following.

Figure 1:
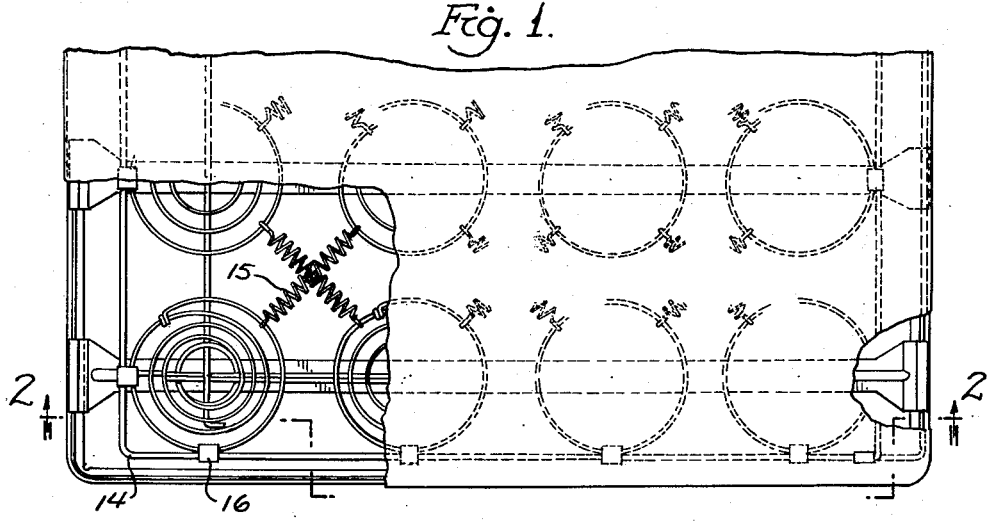
Fig. 1 is a fragmentary plan view of the spring seat with part of the covering broken away.
Figure 2:
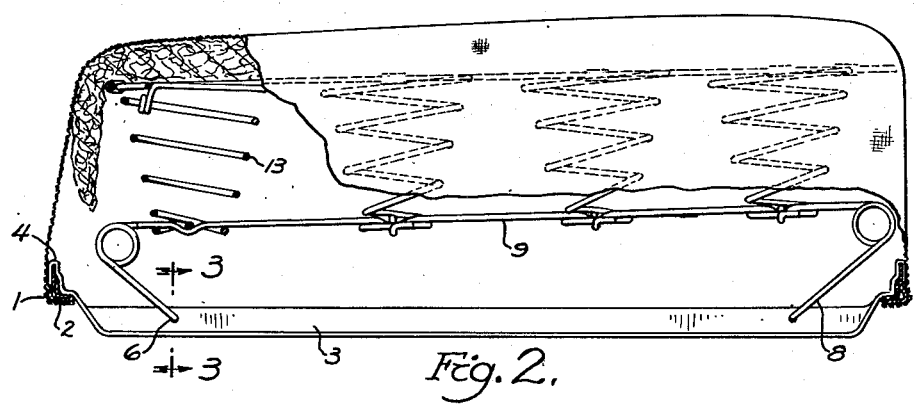
Fig. 2 is a section on the line 2—2 of Fig. 1.
Figure 3:
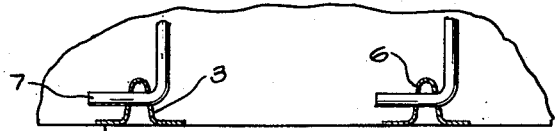
Fig. 3 is a section on the line 3—3 of Fig. 2.

The seat spring frame is formed by an L section bar made up of a strip of metal 1 which is doubled back on itself to form a base 2 of the L section. The metal is then doubled back on the vertical portion of the L to form a double strength for a portion of the heighth of the vertical portion of the L. The cross bars are inverted channels 3 which have hooked ends 4 that hook over the upright portion of the L of the frame bar and are spot welded thereto. The cross channels 3, the flanges 5, and the channel portion of the cross bar form an inverted V section. Openings 6 are punched through these inverted channels near the front and rear ends of the cross bar. These are arranged to take the hooked ends 7 of the safety pin type of spring 8 which forms the end of each stringer 9.

Figure 4:
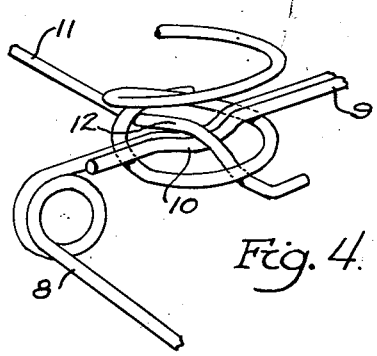
Fig. 4 is a detail in perspective of the anchorage arrangement of the stringers and the load supporting springs.

The stringers 9 are made up of two stiff heavy wires that are brought together in parallel relation as shown in Fig. 4. Each wire ends in one safety pin type of jack spring 8. The other end of the wire is free as shown in Fig. 4. These two stiff wires which make up the stringer are bent to provide dips 10 at each coiled spring. The dip receives a longitudinal stringer 11 which is provided with a riser bump 12 which is adapted to be seated in the dipped portion of the cross stringer. The cross stringers 9 pass over the top of the lowermost whirl of the coiled spring and the longitudinal stringers pass under the lowermost whirl and the two stringers are locked together by their respective dip and riser bumper interlocking as shown in Fig. 4. This provides a very secure anchorage for the coil supporting springs 13. These load supporting springs are of approximately half the length of the normal spring or half the height of the complete seat spring assembly. The employment of these short coil springs results in a considerable saving in material costs as obviously the half length springs are much cheaper than the full length springs. The combined action of the coil springs and the jack springs and the flexible cross stringers 9 provide a seat spring that has substantially the same flexibility and provides substantially the same comfort afforded by the seat spring assembly constructed of full length coil springs. The springs are connected together at their tops by a wire rectangular frame 14 and coil springs 15. The springs are clipped to the border frame 14 by the sheet metal clips 16.

Figure 5:
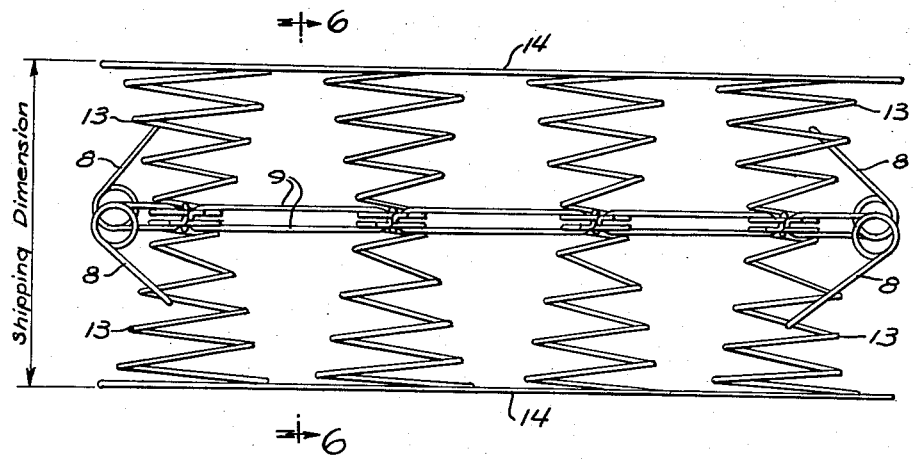
Fig. 5 is a view showing how two seat springs are telescoped together for shipping.
Figure 6:
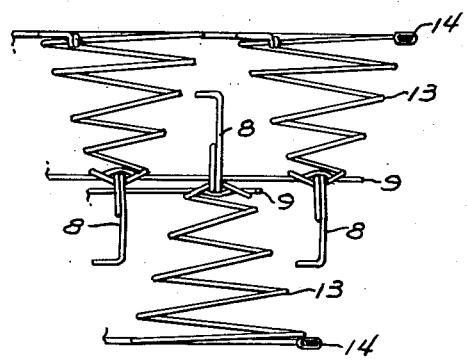
Fig. 6 is a section on the line 6—6 of Fig. 5.

The heavy supporting frame may be shipped separately from the spring assemblies which are shown in Figs. 5 and 6. The wire portion of the spring seat is shipped as a disassembled unit and these wire units may be telescoped as shown in Figs. 5 and 6 so that they occupy substantially only half the shipping space that would be required if the frame and the wire part of the unit were assembled by the spring manufacturer. The frames can be stacked in the plant of the automobile manufacturer after procurement either from the spring manufacturer or some other source. The wire assembly unit, when it arrives at the automobile plant, may be easily assembled to a frame by simply hooking the hooks 7 of the jack spring 8 through the openings 6 punched in the cross bars of the frame. This is a simple assembly job and now the whole spring unit is complete and may be trimmed and assembled in the automobile body.

When I use "seat spring" in the claims, I want it understood that this refers not only to a seat bottom spring, but a seat back spring also.

What I claim is:

1. A seat spring assembly having in combination, a base frame including cross members having upright portions provided with perforations near the front end and the rear end of the cross member, and a wire spring unit comprising an upper frame, coil springs of substantially only one-half the heighth of the said seat spring assembly clipped to the upper frame and connected one with another at the tops of said springs, and flexible cross stringers in the form of stiff spring wires extending across the lower whirls of a row of springs and anchored thereto by having a dip portion at each whirl seated over the whirl, longitudinal stringers having bumped up portions passing under the wire of the lower whirl and above the dip of the cross stringer and each wire cross stringer having a safety pin type of spring leg at each end with a hook portion adapted to hook in the opening of the upright on the cross member of the base frame.

2. A seat spring assembly having in combination, a base frame comprising an angle cross section sheet metal border member and cross members in the form of folded channel strips with the channel inverted and an opening punched through the channel strip near one end and a separate spring wire unit comprising supporting coil springs of substantially half the height of the spring assembly when the frame and the wire unit are united, a frame member uniting the coil springs at the tops of said springs, and cross stringers anchored to the lower whirls of each spring in a row and provided each at the front end with a turned down spring leg having a turned over hooked end which can be hooked into the opening of the cross stringer in the final assembly.

3. A seat spring assembly having in combination, a base frame comprising an angle cross section sheet metal border member and cross members in the form of folded channel strips with the channel inverted and an opening punched through the channel strip near one end and a separate spring wire unit comprising supporting coil springs of substantially half the heighth of the spring assembly when the frame and the wire unit are united, a frame member uniting the coil springs at the tops of said springs and cross stringers anchored to the lower whirls of each spring in a row and provided each at the front end with a turned down spring leg of the jack spring type having a turned over hooked end which can be hooked into the opening of the cross stringer in the final assembly.

4. A seat spring assembly having in combination, a base frame including cross members having upright portions provided with perforations near the front end and the rear end of the cross member, and a wire spring unit comprising an upper frame, coil springs of substantially only one-half the heighth of the said seat spring assembly clipped to the upper frame and connected one with another at the tops of said springs, and flexible cross stringers comprising each a heavy stiff spring wire with dips seated in the lower whirl of each coil spring of a row and each with a turned down spring leg in the form of a safety pin type of spring having a laterally turned hook arranged for hooking into the perforation through the upright portion of the cross member, and longitudinal wire stringers passing under the wire of the lower whirls of the coil springs and each with bumped up portions engaging with the dips of the cross stringers to anchor each coil spring to the longitudinal and cross stringers.

5. A seat spring assembly having in combination, a base frame and a wire spring unit comprising an upper frame, conical open inner end coil springs of substantially only one-half the heighth of the said seat spring assembly clipped to the upper frame and connected one with another at the tops of said springs, and flexible longitudinal and front and rear running wire spring stringers intersecting at right angles and connecting all the coil springs at their lower ends at the intersections of the stringers by the intersecting wires passing one under the wire of the lowermost turn of the spring and the other over such wire, said front and rear running wire spring stringers ending with spring legs at the front to form loops of substantially less than 45 degrees and the legs turned rearwardly and downwardly at a substantial angle from the vertical and said longitudinal stringers having free floating ends, each leg having a laterally turned portion, the said seat spring assembly is secured to the base frame by the laterally turned end portion.

6. A seat spring assembly having in combination, a base frame and a wire spring unit comprising an upper frame, open lower end conical coil load supporting springs of substantially only one-half the heighth of the said seat spring assembly clipped to the upper frame and connected one with another by coiled springs at the tops of said springs, and flexible longitudinal and front and rear running spring wire stringers intersecting and anchoring the lower turns of all the coiled load supporting springs by the intersecting wires passing one under the wire of the lowermost turn of the spring and the other over such wire said front and rear running stringers comprising stiff wire turned down at the front and the rear ends to form spring legs angling substantially from the vertical and provided with laterally turned end portions secured to the base frame to complete the assembly.

7. A seat spring assembly having in combination, a base frame and a wire spring unit comprising an upper frame, open lower end coil springs of substantially only one-half the heighth of the said seat spring assembly clipped to the upper frame and connected one with another at the tops of said springs, flexible stringers comprising stiff wire turned down at the front and rear ends to form safety pin type spring legs in the form of acute angles angling substantially away from the vertical and provided with turned over end portions which can be secured to the base frame, and longitudinal stringer wires intersecting the flexible stringers and interlocking the bottom whirls of all the coiled load supporting springs by the intersecting wires passing one under the wire of the lowermost turn of the spring and the other over such wire.

8. A seat spring assembly having in combination, a base frame and a wire spring unit comprising an upper frame, coil springs of substantially only one-half the heighth of the said seat spring assembly clipped to the upper frame and connected one with another at the tops of said springs, and flexible stringers comprising two wires that lie parallel to each other and that are anchored to each of the bottom turns of the coiled springs, one wire having a jack type of spring at the one end and the other wire having a turned down jack spring at the other end, these two jack springs having laterally turned hooks secured to the base frame by hooking into the frame.

References Cited in the file of this patent

UNITED STATES PATENTS

| Number | Name | Date |
|---|---|---|
| 657,551 | Laughlin | Sept. 11, 1900 |
| 954,331 | O'Brien | Apr. 5, 1910 |
| 1,067,193 | Phelps | July 8, 1913 |
| 2,148,961 | Pleet | Feb. 28, 1939 |
| 2,265,251 | Reed | Dec. 9, 1941 |
| 2,272,807 | Kronheim | Feb. 10, 1942 |
| 2,570,409 | Van Hove | Oct. 9, 1951 |